(12) United States Patent
Elias

(10) Patent No.: US 9,727,082 B2
(45) Date of Patent: Aug. 8, 2017

(54) BACK-SIDE INTERFACE FOR HAND-HELD DEVICES

(75) Inventor: John G. Elias, Townsend, DE (US)

(73) Assignee: Apple Inc., Cupertino, CA (US)

( * ) Notice: Subject to any disclaimer, the term of this patent is extended or adjusted under 35 U.S.C. 154(b) by 1325 days.

(21) Appl. No.: 11/620,424

(22) Filed: Jan. 5, 2007

(65) Prior Publication Data

US 2007/0103454 A1    May 10, 2007

(51) Int. Cl.
*G06F 1/16*         (2006.01)
*G06F 3/0488*       (2013.01)

(52) U.S. Cl.
CPC ............ *G06F 1/1626* (2013.01); *G06F 1/169* (2013.01); *G06F 3/0488* (2013.01)

(58) Field of Classification Search
CPC ....... G06F 1/1626; G06F 1/169; G06F 3/0488
USPC .......................................... 345/173; 715/768
See application file for complete search history.

(56) References Cited

U.S. PATENT DOCUMENTS

| | | | |
|---|---|---|---|
| 5,483,261 A | | 1/1996 | Yasutake |
| 5,488,204 A | | 1/1996 | Mead et al. |
| 5,648,642 A | * | 7/1997 | Miller et al. ................ 178/18.06 |
| 5,729,219 A | * | 3/1998 | Armstrong et al. ............ 341/20 |
| 5,825,352 A | | 10/1998 | Bisset et al. |
| 5,835,079 A | | 11/1998 | Shieh |
| 5,880,411 A | | 3/1999 | Gillespie et al. |
| 6,067,074 A | * | 5/2000 | Lueders ........................ 345/156 |
| 6,188,391 B1 | | 2/2001 | Seely et al. |
| 6,310,610 B1 | | 10/2001 | Beaton et al. |
| 6,323,846 B1 | | 11/2001 | Westerman et al. |
| 6,633,310 B1 | * | 10/2003 | Andrew et al. ................ 715/728 |
| 6,633,314 B1 | * | 10/2003 | Tuli ............................... 715/744 |

(Continued)

FOREIGN PATENT DOCUMENTS

| | | |
|---|---|---|
| CN | 1448833 A | 10/2003 |
| CN | 1531674 A | 9/2004 |

(Continued)

OTHER PUBLICATIONS

Chinese Office Action mailed Jul. 25, 2008, for Chinese Application No. 2008200062686, filed Jan. 4, 2008, four pages.

(Continued)

*Primary Examiner* — Sahlu Okebato
(74) *Attorney, Agent, or Firm* — Morrison & Foerster LLP

(57) ABSTRACT

An electronic device uses separate surfaces for input and output. One of the surfaces (e.g., the bottom) includes a force-sensitive touch-surface through which a user provides input (e.g., cursor manipulation and control element selection). On a second surface (e.g., the top), a display element is used to present information appropriate to the device's function (e.g., video information), one or more control elements and a cursor. The cursor is controlled through manipulation of the back-side touch-surface. The cursor identifies where on the back-side touch-surface the user's finger has made contact. When the cursor is positioned over the desired control element, the user selects or activates the function associated with the control element by applying pressure to the force-sensitive touch-surface with their finger. Accordingly, the electronic device may be operated with a single hand, wherein cursor movement and control element selection may be accomplished without lifting one's finger.

32 Claims, 3 Drawing Sheets

(56) References Cited

U.S. PATENT DOCUMENTS

| | | | |
|---|---|---|---|
| 6,690,387 | B2 | 2/2004 | Zimmerman et al. |
| 6,981,227 | B1* | 12/2005 | Taylor .................... 715/768 |
| 7,015,894 | B2 | 3/2006 | Morohoshi |
| 7,046,230 | B2 | 5/2006 | Zadesky et al. |
| 7,088,342 | B2* | 8/2006 | Rekimoto et al. ........... 345/169 |
| 7,113,196 | B2 | 9/2006 | Kerr |
| 7,184,064 | B2 | 2/2007 | Zimmerman et al. |
| 7,219,308 | B2* | 5/2007 | Novak et al. ................ 715/768 |
| 7,403,192 | B2* | 7/2008 | Lai ............... 345/173 |
| 7,452,098 | B2 | 11/2008 | Kerr |
| 7,495,659 | B2 | 2/2009 | Marriott et al. |
| 7,499,040 | B2 | 3/2009 | Zadesky et al. |
| 7,663,607 | B2 | 2/2010 | Hotelling et al. |
| 8,479,122 | B2 | 7/2013 | Hotelling et al. |
| 2002/0118175 | A1* | 8/2002 | Liebenow et al. ........... 345/168 |
| 2002/0140680 | A1 | 10/2002 | Lu |
| 2003/0095095 | A1* | 5/2003 | Pihlaja ................... 345/156 |
| 2003/0174072 | A1* | 9/2003 | Salomon ................... 341/22 |
| 2003/0184528 | A1* | 10/2003 | Kawasaki et al. ........... 345/173 |
| 2003/0202015 | A1* | 10/2003 | Battles et al. ............. 345/764 |
| 2003/0234768 | A1* | 12/2003 | Rekimoto et al. ........... 345/169 |
| 2003/0235452 | A1* | 12/2003 | Kraus et al. ............... 400/472 |
| 2004/0156192 | A1 | 8/2004 | Kerr et al. |
| 2004/0207766 | A1* | 10/2004 | Sata et al. ............... 348/734 |
| 2005/0162402 | A1* | 7/2005 | Watanachote ............. 345/173 |
| 2006/0026521 | A1 | 2/2006 | Hotelling et al. |
| 2006/0026535 | A1 | 2/2006 | Hotelling et al. |
| 2006/0097983 | A1* | 5/2006 | Haggman et al. ........... 345/156 |
| 2006/0097985 | A1* | 5/2006 | Ha et al. ................. 345/156 |
| 2006/0097991 | A1 | 5/2006 | Hotelling et al. |
| 2006/0197750 | A1* | 9/2006 | Kerr et al. .............. 345/173 |
| 2006/0197753 | A1 | 9/2006 | Hotelling |
| 2006/0271875 | A1* | 11/2006 | Green et al. ............. 715/768 |

FOREIGN PATENT DOCUMENTS

| | | |
|---|---|---|
| GB | 2393688 | 1/2006 |
| JP | 2000-163031 A | 6/2000 |
| JP | 2002-342033 A | 11/2002 |
| WO | WO-2008/085760 A2 | 9/2008 |
| WO | WO-2008/085760 A3 | 9/2008 |

OTHER PUBLICATIONS

International Search Report mailed Jun. 26, 2008, for PCT Application No. PCT/US07/88982, filed Dec. 27, 2007, three pages.

Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.

Rubine, D.H. (Dec. 1991). "The Automatic Recognition of Gestures," CMU-CS-91-202, Submitted in Partial Fulfillment of the Requirements of the Degree of Doctor of Philosophy in Computer Science at Carnegie Mellon University, 285 pages.

Rubine, D.H. (May 1992). "Combining Gestures and Direct Manipulation," CHI '92, pp. 659-660.

Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.

Chinese Search Report completed Jan. 6, 2011, for CN Patent Application No. 2008200062686, filed Jan. 4, 2008, with English Translation, 16 pages.

U.S. Appl. No. 10/654,108, filed Sep. 2, 2003, by Hotelling et al.

\* cited by examiner

BACK-SIDE INTERFACE FOR HAND-HELD DEVICES

The subject matter claimed herein is related to the subject matter described in U.S. patent applications Ser. No. 11/278,080 entitled "Force Imaging Input Device and System" by Steve Hotelling and Brian Huppi (filed 30 Mar. 2006), 11/382,402 entitled "Force and Location Sensitive Display" by Steve Hotelling (filed 9 May 2006) and 10/840,862 entitled "Multipoint Touchscreen" by Steve Hotelling and Brian Huppi (filed 6 May 2004) and 11/115,539 entitled "Hand Held Electronic Device with Multiple Touch Sensing Devices" by Duncan Robert Kerr, Steve Hotelling and Brian Huppi (filed 26 Apr. 2005), all of which are hereby incorporated by reference.

BACKGROUND

The invention relates generally to user input for computer systems and more particularly to a touch and force-sensitive back-side interface for hand-held electronic devices (e.g., hand-held electronic and computer platforms).

An increasingly popular form of electronic device is the hand-held multi-media device. Illustrative devices of this type include palm or hand-held personal computers, tablet computer systems, mobile telephones, personal digital assistants, portable video players and portable audio players. One specific example of such a device is the video iPod® from Apple Computer. (IPOD is a registered trademark of Apple Computer, Inc.) In this class of device the display screen, typically a liquid crystal display ("LCD"), is often to small to make effective use of finger based touch input. Although a touch-screen interface could be embedded in or overlaid on the display, the use of even a single finger for input may occlude a significant portion of the display or cover more than a single operational control element. While this problem could be mitigated by limiting the touch area to a portion of the display screen (e.g., the display edges where horizontal or vertical motion could emulate slider controls), a single finger could still cover a substantial amount of the useful display area. In addition, display smudging is a problem as with all finger sensitive touch-screen interfaces. While stylus based touch-screens may be used to partially reduce the occluding problem and eliminate smudging, they suffer a large disadvantage compared to finger based touch-screen systems in that they require the storage and removal of a stylus. In addition, for small hand-held devices a stylus input requires the use of two hands: one to hold the device and one to hold and manipulate the stylus.

SUMMARY

In one embodiment the invention provides a method to operate an electronic device. The method includes displaying first information appropriate to the device's function on a display element on a top surface of the electronic device (e.g., video, graphic or textual information), displaying one or more control elements and a cursor on the display element (e.g., numeric or alphanumeric keys, buttons, sliders and control wheels), adjusting the cursor's displayed position in response to an object contacting a force-sensitive touch-surface on the device's bottom surface, and activating or executing a function associated with one of the control elements when the cursor is positioned "over" the control element and a force is applied to the force-sensitive touch-surface at a position corresponding to the cursor. In a preferred embodiment, the control elements are displayed transparently so that the first information is not totally occluded by the display of the control elements. A program implementing the method may be stored in any media that is readable and executable by a computer processor.

In another embodiment, the invention provides an electronic device that may be operated in accordance with the described method. Illustrative electronic devices of the type described and taught herein include, but are not limited to, hand-held computer systems, tablet computer systems, personal digital assistants, portable video playback system, portable audio playback systems and mobile telephones.

DETAILED DESCRIPTION

The following description is presented to enable any person skilled in the art to make and use the invention as claimed and is provided in the context of the particular examples discussed below, variations of which will be readily apparent to those skilled in the art. Accordingly, the claims appended hereto are not intended to be limited by the disclosed embodiments, but are to be accorded their widest scope consistent with the principles and features disclosed herein.

Figure 1:
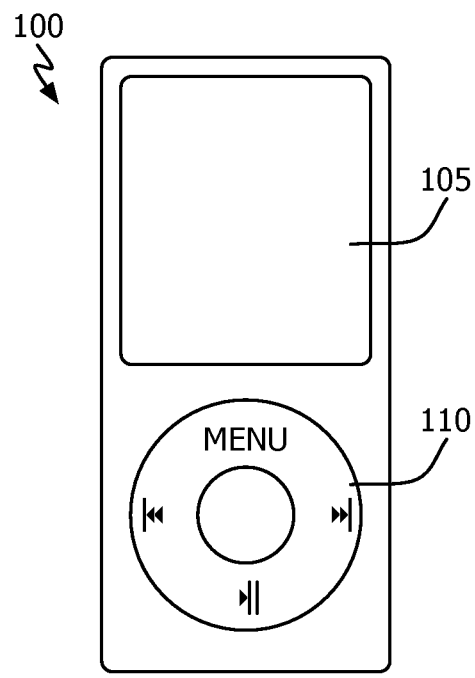
FIG. 1 shows a perspective view of a prior art hand-held multi-media device.

Small multi-media hand-held devices such as mobile telephones and video playback units typically divide their front surface into an output region (through which video or graphic information is presented) and an input region (comprising one or more control elements through which a user operates the device). An illustrative prior art device that is laid out in this manner is the iPod® from Apple Computer, Inc. As shown in FIG. 1, the output region of iPod® 100 comprises LCD 105 and the input region comprises a single multi-function control element—spin or click-wheel 110.

In contrast, a multi-media device in accordance with the invention uses separate device surfaces for input and output. More specifically, a force-sensitive touch-surface is provided on a first or back-side surface of the device through which a user provides input (e.g., cursor manipulation and control element selection/activation). On a second or front-side surface, a display element is used to present one or more control elements and a cursor that is controlled through manipulation of the back-side touch-surface. When the device is activated or placed into an operational state where it is appropriate, control elements (e.g., soft keys and menus) are displayed on the display element. The soft keys may be opaque or transparent (so as not to occlude prior displayed information such as a video presentation, a picture, a graphic or textual information). The displayed cursor identifies where on the back-side touch-surface the user has their finger. When the cursor is positioned over the desired control element/soft key (i.e., spatially overlapping on the display element), the user selects or activates the control element by applying pressure to the force-sensitive touch-surface with their finger. Accordingly, the invention provides a means to operate a hand-held electronic device with one hand, wherein cursor movement and control element selection/activation may be accomplished without lifting one's finger.

Figure 2:
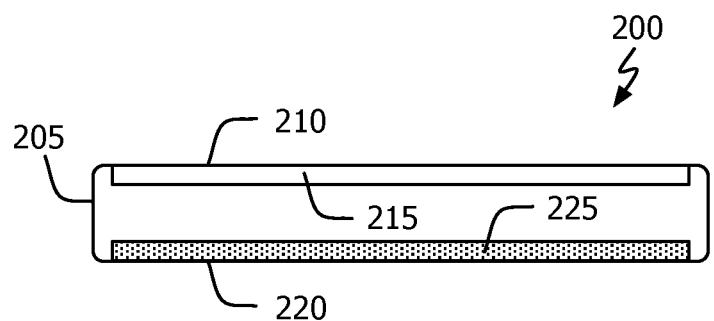
FIG. 2 shows, in cross-section, a hand-held multi-media device in accordance with one embodiment of the invention.

Referring to FIG. 2, a cross-sectional view of multi-media hand-held device 200 in accordance with one embodiment of the invention includes device housing 205, top surface 210 having display element 215 and bottom surface 220 having force-sensitive touch-surface 225. As used herein, a force-sensitive touch-surface is a surface that is adapted to simultaneously detect where one or more objects touch it (e.g., fingers) and the force those objects apply to the surface. Illustrative embodiments of force-sensitive capacitance-based touch-surfaces are described in the documents identified above. Illustrative display elements include LCD panels.

Figure 3A:
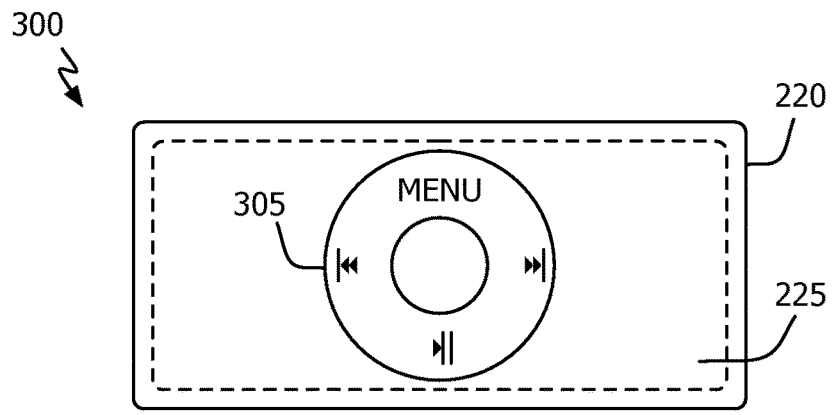
FIGS. 3A and 3B show one embodiment of a multi-media hand-held device in accordance with the invention.
Figure 3B:
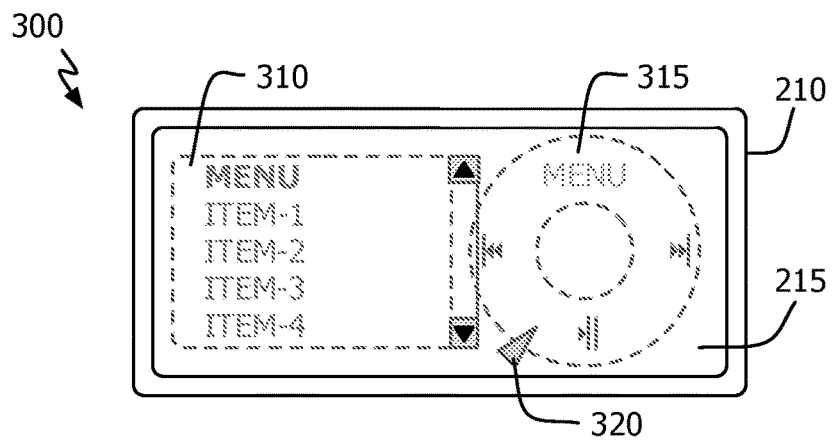

Referring to FIG. 3A, hand-held multi-media device 300 in accordance with one embodiment of the invention incorporates the functionality of click-wheel 305 on the device's force-sensitive touch-surface 225 (on bottom surface 220). Click-wheel 305 may be represented on touch-surface 225 by, for example, an etched or raised outline. Referring to FIG. 3B, when the user activates click-wheel 305, navigation menu 310 and click-wheel 315 are shown. Also displayed is cursor 320 which shows the position of the user's finger against the back-side touch-surface relative to click-wheel 315. In the illustrated embodiment, navigation menu 310 and click-wheel 315 are rendered transparently (denoted by dashed lines in FIG. 3B) so that the user may continue to view whatever information was being displayed at the time they activated the back-side control. Once the user manipulates cursor 320 by sliding their finger across force-sensitive touch-surface 225 to the desired position (e.g., the "pause" control element position on click-wheel 315), all the user need do is apply pressure with that finger to the force-sensitive touch-surface to activate the desired action. Thus, a user may move the displayed cursor and make a selection (aka a "mouse-click") without lifting their finger from surface 225. In this manner multi-media device 300 may be controlled by the user with a single hand.

In another embodiment, a multi-media hand-held device such as device 300 may provide more than a single control element. In embodiments of this type, each control element (e.g., button, key, slider or click-wheel) may have an etched counterpart on back-side touch-surface 225, with each being displayed as desired (one at a time depending upon where the user's finger is detected, or all at once). In yet another embodiment, control element outlines are not etched or otherwise denoted on back-side touch-surface 225.

Figure 4:
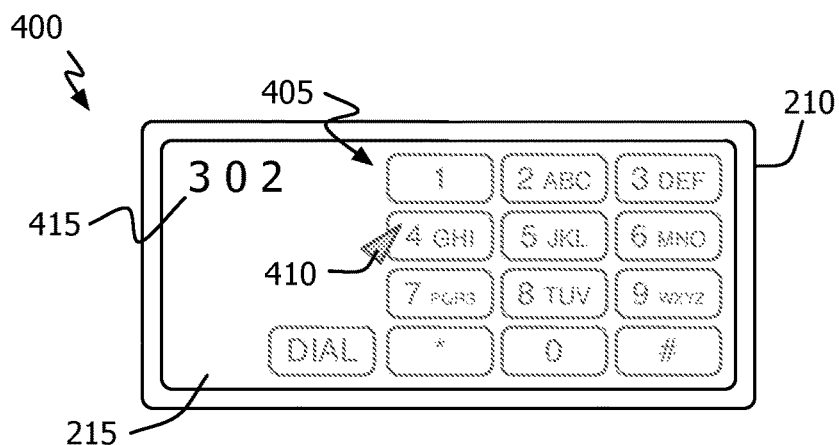
FIG. 4 shows another embodiment of a multi-media hand-held device in accordance with the invention wherein alpha-numeric input control elements are provided.

While the interface of FIGS. 3A and 3B may be effective for selecting items from a list, it is not as convenient for alphanumeric input. Accordingly, in another embodiment of the invention one or more control elements may be displayed when the device's back-side force-sensitive touch-surface is activated (see discussion below). Referring to FIG. 4, in one embodiment suitable for a device that incorporates mobile telephone capability, device 400 displays numeric soft keys 405 on display screen 215 situated on front surface 210. The user may select or activate one or more of the displayed buttons by moving their finger(s) across back-side force-sensitive touch-surface 225 so as to position cursor 410 above (i.e., spatially coincident with) the desired button. Selection may be made by applying pressure to the back side of the device as discussed above. For the user's convenience, previously selected numbers 415 may be displayed.

Figure 5:
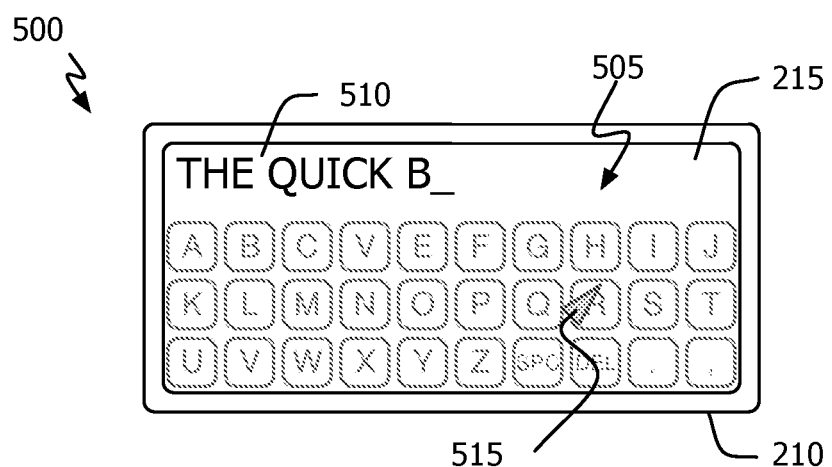
FIG. 5 shows yet another embodiment of a multi-media hand-held device in accordance with the invention wherein alpha-only input control elements are provided.

Referring to FIG. 5, in yet another embodiment in accordance with the invention, device 500 displays alpha soft keys 505 on display element 215 on front surface 210. By selecting various keys 505, the user may enter character strings (e.g., string 510). As before, the user positions cursor 515 through movement of their fingers across the device's back-side force-sensitive touch-surface; button selection is made through the application of pressure to the back-side touch-surface. As shown, device 500 displays alpha buttons 505 transparently so that the user may continue to view information that may be displayed "beneath" them. Of course, buttons 505 may be opaque.

In still another embodiment, a multi-media hand-held device having a back-side force-sensitive touch-surface may utilize two or more of the interfaces described above. For example, in a first mode (e.g., a music playback mode), the click-wheel interface described above with respect to FIGS. 3A and 3B could be employed (with or without backside surface etching). In another mode (e.g., a telephone mode), the interface described above with respect to FIG. 4 could be implemented. In still another mode (e.g., text input, electronic mail or instant messaging modes) the alpha interface described in connection with FIG. 5 may be used. Other interfaces will be apparent to one of ordinary skill in the art having the benefit of this disclosure.

In some embodiments, the display of control elements and/or a menu may be triggered by a specific user action. For example, by the user holding their finger on back-side touch-surface 225 within the region defined by an etched control element (e.g., click-wheel 305) for a specified period of time (e.g., one second). Another user action to trigger activation of a mode-appropriate user interface would be to simply hold one or more fingers against the back-side force-sensitive touch-surface for a specified period of time and with at least a minimum specified force (e.g., a "light" grip or poke).

Alternatively, a change in device 200's operational state may cause the same result. For instance, appropriate control element or menu may be displayed when device 200 transitions from a first state to a second state. Illustrative operational states include, but are not limited to—on, off, locked, phone mode, video play mode, audio play mode, calendar mode, email mode, address book mode and image capture mode. Thus, a single user action may have cause different control elements to be displayed (or no control elements at all), depending on the device's current operational state.

Figure 6:
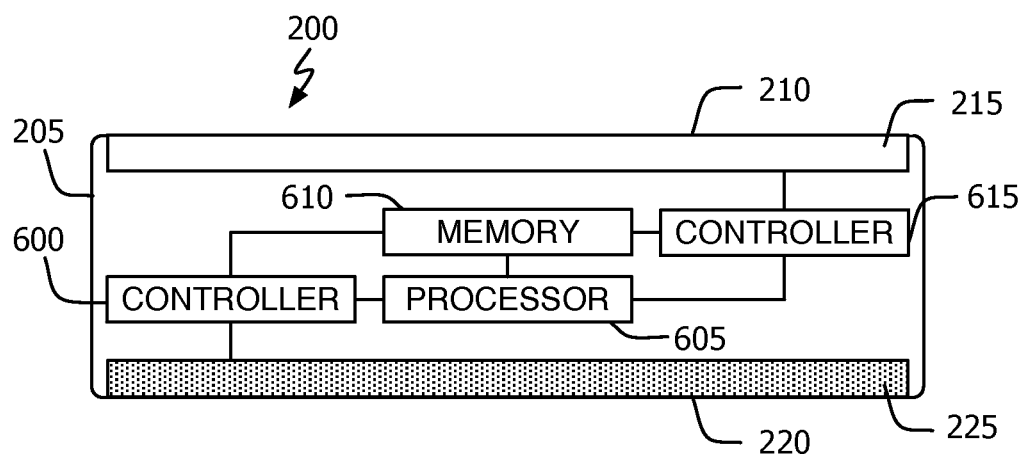
FIG. 6 shows, in block diagram format, an electronic device in accordance with one embodiment of the invention.

Referring to FIG. 6, an illustrative implementation of hand-held multi-media device 200 includes force-sensitive touch-surface controller 600, processor 605, memory 610 and display element controller 615. Controller 600 provides the necessary drive and sensing circuitry to obtain location and force information from force-sensitive touch-surface 225. In a typical implementation, touch-surface 225 is comprised of a number of sensing elements arranged in two-dimensional array. Each sensing element (aka "pixel") generates an output signal indicative of the electric field disturbance (for capacitance sensors), force (for pressure sensors) or optical coupling (for optical sensors) at the sensor element. The ensemble of pixel values at a given time represents a "proximity image." Touch-surface controller 600 provides this data to processor 605 or to memory 610. Processor 605, in turn, processes the proximity image information to correlate the user's finger movement across touch-surface 225 with the displayed information. Memory 610 may include one or more of the following types of storage media: magnetic disks; optical media; and semiconductor memory devices such as static and dynamic random access memory (RAM), Electrically Programmable Read-Only Memory ("EPROM"), Electrically Erasable Programmable Read-Only Memory ("EEPROM"), Programmable Gate Arrays and flash devices. Display controller 615 is responsible for producing the display element signals necessary to actually display information.

Various changes in the materials, components, circuit elements techniques described herein are possible without departing from the scope of the following claims. For instance, illustrative multi-media hand-held device 300 has been described as including an etched control element on its back-side touch-surface. This is not necessary. Further, multimedia devices in accordance with the invention may include physical buttons/switches in addition to a force-sensitive touch-surface (e.g., power, mute and reset buttons). In addition, processor 605 may be a single computer processor, a special purpose processor (e.g., a digital signal processor or "DSP"), a plurality of processors coupled by a communications link or a custom designed state machine. Custom designed state machines may be embodied in a hardware device such as an integrated circuit including, but not limited to, application specific integrated circuits ("ASICs") or field programmable gate array ("FPGAs"). Processor 605 may also execute program instructions stored in memory 610 to perform the acts described herein.

The invention claimed is:

1. A method for operating a hand-held electronic device, the hand-held electronic device comprising a display element on a first surface of the hand-held electronic device and a touch surface on a second surface of the hand-held electronic device, the touch surface including at least one physical representation of a control element etched into the touch surface, the method comprising:
   detecting a contact on the physical representation of the control element on the touch surface;
   displaying a virtual representation of the control element on the display element in response to detecting the contact on the physical representation of the control element on the touch surface;
   detecting a movement of the contact on the touch surface; and
   adjusting a display position of a cursor in response to the movement of the contact such that the display position of the cursor on the displayed virtual representation of the control element is coincident with a location of the contact on the physical representation of the control element on the touch surface.

2. The method of claim 1, wherein the control element includes one of a button, a slider, a spin-wheel, a numeric input key, an alpha input key and an alpha-numeric input key.

3. The method of claim 1, wherein the virtual representation of the control element includes a translucent control element.

4. The method of claim 3, further comprising:
   displaying first information on the display element, wherein displaying the virtual representation of the translucent control element includes displaying the virtual representation of the translucent control element so that the first information remains at least partially visible through the virtual representation of the translucent control element.

5. The method of claim 1, wherein the virtual representation of the control element includes an opaque control element.

6. The method of claim 1, wherein the virtual representation of the control element includes an item on a displayed menu, wherein the menu item identifies the function associated with the control element.

7. The method of claim 1, wherein the cursor is a translucent cursor.

8. The method of claim 1, further comprising:
   selecting a specified state associated with an operational mode of the hand-held electronic device, wherein the virtual representation of the control element and the cursor are displayed after the selection of the specified state.

9. The method of claim 8, wherein the operational mode includes a telephone mode.

10. The method of claim 8, wherein the operational mode includes an alpha-numeric data entry mode.

11. The method of claim 8, wherein the operational mode includes a character-based input mode.

12. The method of claim 1, wherein the hand-held electronic device includes a mobile telephone.

13. The method of claim 1, wherein the hand-held electronic device includes a hand-held computer system.

14. The method of claim 1, wherein the hand-held electronic device includes a personal digital assistant.

15. The method of claim 1, wherein the hand-held electronic device includes a video display unit.

16. The method of claim 1, wherein the hand-held electronic device includes a digital music device.

17. A program storage device, readable by a processor of the hand-held electronic device, comprising instructions stored thereon for causing the hand-held electronic device to perform the method in accordance with claim 1.

18. A hand-held electronic device, comprising:
   a first surface having a display element coupled thereto;
   a second surface having a touch-surface coupled thereto, the touch-surface including at least one physical representation of a control element etched into the second surface, the second surface not coplanar with the first surface, the touch-surface adapted to detect a movement of a contact on the touch surface; and
   a controller configured to:
      display on the display a virtual representation of the control element in response to the detected contact on the physical representation of the control element on the touch-surface,
      display a mark, and
      move the mark based on the movement of the contact on the physical representation of the control element.

19. The hand-held electronic device of claim 18, wherein the device includes a mobile telephone.

20. The hand-held electronic device of claim 18, wherein the device includes a video playback device.

21. The hand-held electronic device of claim 18, wherein the device includes an audio playback device.

22. The hand-held electronic device of claim 18, wherein the device includes a personal digital assistant.

23. The hand-held electronic device of claim 18, wherein the controller is further configured to display first information including one or more of the following types of information: video, graphic and textual.

24. The hand-held electronic device of claim 23, wherein the first information is displayed opaque.

25. The hand-held electronic device of claim 18, wherein the control elements include one or more of a button, a numeric key, an alpha key, a slider, a click-wheel and a menu.

26. The hand-held electronic device of claim 18, wherein the virtual representation of the control element is transparent.

27. The hand-held electronic device of claim 18, further comprising one or more physical buttons coupled to a surface of the device.

28. The hand-held electronic device of claim 27, wherein one of the one or more physical buttons includes a power button adapted to turn-off the display element.

29. The hand-held electronic device of claim 18, wherein the displaying is activated after the motion of the contact has been held substantially in one place for a specified period of time.

30. The hand-held electronic device of claim 18, wherein the physical representation of the control element further comprising at least one etched button on the second surface, the at least one etched button corresponding to the displayed virtual representation of the control element.

31. The method of claim 1, wherein the first surface is a front-side surface of the hand-held electronic device, and the second surface is a back-side surface of the hand-held electronic device.

32. The hand-held electronic device of claim 18, wherein the first surface is a front-side surface of the hand-held electronic device, and the second surface is a back-side surface of the hand-held electronic device.

* * * * *